Patented June 14, 1932

1,863,154

UNITED STATES PATENT OFFICE

MILES A. DAHLEN, OF WILMINGTON, DELAWARE, ASSIGNOR TO E. I. DU PONT DE NEMOURS & COMPANY, OF WILMINGTON, DELAWARE, A CORPORATION OF DELAWARE

SOLID DIAZO SALTS

No Drawing. Application filed October 31, 1929. Serial No. 403,919.

This invention relates to new solid diazo salts and the process of their production, and more particularly relates to compositions of matter formed by the interaction of mineral acid diazo salt solutions and negatively substituted diphenyl derivatives, in which latter, at least one of the substituents is a sulphonic acid group.

The invention has as an object the formation of solid diazo salts, valuable in certain dyeing and printing processes. A further object is the preparation of such diazo salts in a form in which they show the proper solubility, stability and coupling power for use in such dyeing and printing processes.

These objects are accomplished by the present invention through the interaction of diazo salt solutions obtained from unsulphonated substituted aromatic amines with sulphonic acids (or suitable metal salts thereof) of the diphenyl series under suitable conditions of temperature, acidity, and concentration of the reacting materials, and the filtration and drying of the products under conditions applicable to the specific case.

In general, in preparing such solid diazo salts, the procedure outlined below is followed though obviously variations may be introduced to meet the exigencies of a particular case.

The unsulphonated substituted amine is dissolved or suspended in a quantity of a suitable mineral acid of correct concentration to facilitate diazotization. Nitrous acid or a substance capable of generating nitrous acid in such an acid medium is added, while the factors of temperature, agitation, and rate of addition are controlled to secure diazotization. These steps are well understood in the art. To the solution of diazonium salt thus resulting is added, with proper control of temperature, agitation, and rate of addition: (1) a sufficient quantity of the solid sulphonic acid of the diphenyl series to precipitate the diazo salt; or (2) a like quantity of a suitable solid metallic salt of the sulphonic acid of the diphenyl series, as above-described; or (3) a like quantity of a solution of the sulphonic acid of the diphenyl series, as above-described; or (4) a like quantity of a solution of a suitable metallic salt of the sulphonic acid of the diphenyl series, as above-described. The solid diazo salt which thus results is filtered and dried under conditions which will not cause its decomposition.

Obviously, when desirable, the diazo salts may alternatively be formed by diazotizing the amine in a solution containing the required amount of a diphenyl sulphonic acid or one of the derivatives of diphenyl sulphonic acid mentioned above.

The following examples are furnished in order to disclose in detail the process of preparing the new compounds. It is to be understood, however, that the examples are purely illustrative and that it is not applicant's intention to be limited to the specific reagents, proportions or operating conditions therein disclosed. In the examples all the parts are indicated by weight.

Example 1

A diazo solution, prepared from 30 parts meta-nitro-para toluidine, 55 parts of hydrochloric acid of 30% strength, 14.5 parts of sodium nitrite, 90 parts of water and 60 parts of ice, is stirred with 75 parts of the disodium salt of diphenyl-4:4'-disulphonic acid until the precipitation of diazo salt is finished. The separated diazo salt is then filtered and dried at a moderate temperature.

It is a light brown powder of moderate solubility, and is useful either as such or with the addition of certain substances in the preparation of solutions or suspensions for use in dyeing and printing processes, as well as for the preparation of certain azo colors in substance.

In place of the disodium salt of diphenyl-4:4'-disulphonic acid the salts of other sulphonic acids of diphenyl may be employed such as, for example, 2- or 4-nitro-diphenyl-sulphonic acid, 2-chloro-diphenyl-disulphonic acid, or the nitro-chloro-diphenyl-sulphonic acids.

Example 2

A diazo solution prepared from 20.5 parts

2:5-dichloro-aniline, 80 parts of hydrochloric acid of 30% strength, 10.5 parts of sodium nitrite, 40 parts of water and 60 parts of ice is stirred with 35 parts of the sodium salt of diphenyl-4-sulphonic acid until the precipitation of diazo salt is finished. The separated diazo salt is then filtered and dried at a moderate temperature. It is a yellow powder of moderate solubility and may be used in dyeing and printing processes, or for the preparation of azo colors in substance as described under Example 1.

Derivatives of diphenyl-sulphonic acid or diphenyl-disulphonic acid may be used in place of diphenyl-4-sulphonic acid.

Example 3

A diazo solution prepared from 32 parts of para-nitro-ortho-anisidine, 80 parts of hydrochloric acid of 30% strength, 10.5 parts of sodium nitrite, 40 parts of water and 60 parts of ice is stirred with 80 parts of the disodium salt of 4-chloro-diphenyl-disulphonic acid until the precipitation of diazo salt is finished. The separated diazo salt is then filtered and dried at a moderate temperature. It is a very light brown powder of moderate solubility in water, which is suitable for use in dyeing and printing processes.

Example 4

A diazo solution prepared from 12 parts of 1-amino-2-methoxy-naphthalene, 20 parts of hydrochloric acid of 30% strength, 5 parts of sodium nitrite, and 40 parts of water and ice is stirred with 35 parts of diphenyl-4-sodium-sulphonate until the precipitation of diazo salt is finished. The separated diazo salt is then filtered and dried at a moderate temperature. It is a light gray powder of moderate solubility in water and is useful in dyeing and printing processes, as well as for the preparation of azo colors.

The following table indicates additional combinations of diazo bodies and sulphonic acids which have been found to yield valuable solid diazo salts of the type contemplated by the invention:

| Amine diazotized | Sulphonic acid (or salt thereof) used for precipitation |
| --- | --- |
| Meta-nitro-para-toluidine | Diphenyl-4-sulphonic acid. |
| Meta-nitro-para-toluidine | 4 - nitro - diphenyl - 4' - sulphonic acid |
| Meta-nitro-para-toluidine | 2 - nitro - diphenyl - 4' - sulphonic acid |
| Meta-nitro-para-toluidine | 4 - chloro - diphenyl - 4' - sulphonic acid |
| Meta-nitro-para-toluidine | 2 - chloro - diphenyl - 4' - sulphonic acid |
| 2:5-dichloroaniline | Diphenyl - 4:4' - disulphonic acid |
| 2:5-dichloroaniline | 4 - nitro - diphenyl - disulphonic acid |
| 2:5-dichloroaniline | 2 - nitro - diphenyl - disulphonic acid |
| Para-nitro-ortho-anisidine | Diphenyl - 4:4' - disulphonic acid |
| Para-nitro-ortho-anisidine | 2 - chloro - diphenyl - disulphonic acid |
| Dianisidine | Diphenyl - 4:4' - disulphonic acid |
| Para-chloro-ortho-toluidine | Diphenyl-4-sulphonic acid |
| Ortho-chloro-ortho'-amino-diphenyl-ether | Diphenyl-4-sulphonic acid |
| Aminoazobenzene | Diphenyl-4-sulphonic acid |
| Para-nitro-ortho-anisidine | Nitro - chloro - diphenyl - disulphonic acid. |

It will be apparent from the above that a large number and variety of compounds is contemplated by the present invention, and that in their preparation the negatively substituted diphenyl derivatives in which at least one of the substituents is a sulphonic acid group may be employed as a class with the unsulphonated substituted aromatic amines. Of these compounds, those obtained from the primary phenyl amines and the diphenyl-sulphonic acids are preferred, and particularly the product obtained from diazotized meta-nitro-p-toluidine and diphenyl-4-4'-disulphonic acid as described in Example 1.

It also will be apparent from the above that where the expression "negative group" or "negative substituent" is employed, it is intended to include a sulphonic acid group containing a metallic substituent. Also, it will be apparent that H is not considered to be a substituent of the diphenyl compound but rather a component part thereof.

By the term "positive" substituent it is intended to cover a substituent which tends to increase the positive character of the molecule, as for example, an amino group.

By the term "negative" substituent it is intended to cover a substituent which tends to increase the negative character of the molecule, as for example, halogen, nitro and sulphonic acid radicals.

The diazo salts precipitated as described above are crystalline solids, varying from white to brown in color. Their solubility in water varies according to the particular amine diazotized and the particular sulphonic acid used in precipitation. At ordinary temperatures they are stable for indefinite periods of time, and darken only slowly on exposure to strong light. This effect is especially noticeable if the exposure takes place in the presence of moisture. They exhibit to a surprising degree the solubility, stability, and coupling power necessary to make them suitable for use in dyeing and printing.

The exact chemical constitution of the solid salts, however, is in doubt and it is therefore impossible, at the present time, to indicate them by a general formula.

The new salts may be applied to the fabric by any of the methods commonly employed in the dyeing and printing arts. For example, cotton yarn may be impregnated with the anilide of 2-hydroxy-3-naphthoic acid by immersion in a water solution of the sodium salt of this compound. This impregnated yarn is then placed in a solution of one of these diazo salts when the color is immediately produced on the fiber. In the printing art, cotton piece goods is impregnated with an arylide of 2-hydroxy-3-naphthoic acid, dried, and subsequently printed with a prepared paste of one of these diazo salts. The color is then developed in the usual manner and the excess of the arylide removed by washing.

It will be understood that, in employing the solid salts described herein, in order to meet the particular conditions or requisites of a given dyeing or printing operation, it may be advisable to add to the salt preparation any of the well known substances ordinarily employed in this art, such as, for example, sodium chloride, sodium sulphate, sodium bicarbonate, aluminum sulphate, or potassium aluminum sulphate, or a mixture of these salts.

As many apparent and widely different embodiments of this invention may be made without departing from the spirit thereof, it is to be understood that I do not limit myself to the foregoing examples or description except as indicated in the following claims:

I claim:

1. As a new composition of matter, a solid crystalline diazo salt obtained by the interaction of a diazo body obtained from an unsulphonated primary aromatic amine and the disodium salt of diphenyl-4:4'-disulphonic acid.

2. As a new composition of matter, a solid crystalline diazo salt obtained by the interaction of a diazo body obtained from an unsulphonated primary phenyl amine containing a substituent of the class consisting of nitro, chlor, alkyl and alkoxy groups, and a diphenyl compound containing one or more substituents of the class consisting of nitro, sulphonic acid and chloro groups, at least one of which substituents is a sulphonic acid group.

3. As a new composition of matter, a solid, stable, crystalline diazo salt obtained by the interaction of an acid solution of diazotized meta-nitro-p-toluidine and a diphenyl compound containing one or more substituents of the group consisting of halogen, nitro and sulphonic acid radicals, at least one of which substituents is a sulphonic acid group.

4. As a new composition of matter, a solid, stable, crystalline diazo salt obtained by the interaction of an acid solution of diazotized meta-nitro-p-toluidine and a diphenyl-disulphonic acid which may contain substituents of the group consisting of halogen, nitro and sulphonic acid radicals.

5. As a new composition of matter, a solid, stable, crystalline diazo salt obtained by the interaction of an acid solution of approximately 30 parts of diazotized meta-nitro-p-toluidine and approximately 75 parts of the disodium salt of diphenyl-4:4'-disulphonic acid.

6. The process of preparing a solid diazo salt which comprises interacting, in acid solution, a diazo body obtained from an unsulphonated primary aromatic amine and a diphenyl compound containing one or more substituents of the group consisting of halogen, nitro and sulphonic acid radicals, at least one of which substituents is a sulphonic acid group.

7. The process of preparing a solid diazo salt which comprises interacting, in acid solution, a diazo body obtained from an unsulphonated primary aromatic amine and a diphenyl-sulphonic acid containing only substituents of the class consisting of nitro, sulphonic acid and chloro groups.

8. The process of preparing a solid diazo salt which comprises interacting, in acid solution, diazotized meta-nitro-p-toluidine and a diphenyl compound containing one or more substituents of the group consisting of halogen, nitro and sulphonic acid radicals, at least one of which substituents is a sulphonic acid group.

9. The process of preparing a solid diazo salt which comprises interacting in acid solution approximately 30 parts of diazotized meta-nitro-p-toluidine and approximately 75 parts of the disodium salt of diphenyl-4:4'-disulphonic acid.

10. As a new composition of matter, a solid, stable, crystalline diazo salt obtained by the interaction of an acid solution of diazotized 2:5-di-chloro-aniline and a diphenyl-disulphonic acid which may be substituted by one or more members of the group consisting of halogen and nitro radicals.

11. As a new composition of matter, a solid, stable, crystalline diazo salt obtained by the interaction of an acid solution of diazotized para-nitro-ortho-anisidine and a diphenyl-disulphonic acid which may be substituted by one or more members of the group consisting of halogen and nitro radicals.

12. As a new composition of matter, a solid crystalline diazo salt obtained by the interaction of a diazo body obtained from an unsulphonated nitro substituted primary phenyl mono-amine and a dipheynl compound containing one or more substituents, but only substituents of the group consisting of nitro, chloro and sulphonic acid, at least one of which substituents is a sulphonic acid group.

13. As a new composition of matter, a solid, stable, crystalline diazo salt obtained by the interaction of an acid solution of diazotized meta-nitro-p-toluidine and a diphenyl compound containing only substituents of the group consisting of nitro, chloro and sulphonic acid, at least one of which substituents is a sulphonic acid group.

14. As a new composition of matter, a solid, stable, crystalline diazo salt obtained by the interaction of an acid solution of diazotized meta-nitro-p-toluidine and a diphenyl-disulphonic acid containing only substituents of the group consisting of nitro, chloro and sulphonic acid.

15. The process of preparing a solid diazo salt which comprises interacting, in acid solution, diazotized meta-nitro-p-toluidine and a diphenyl compound containing only substituents of the group consisting of nitro, chloro and sulphonic acid, at least one of which substituents is a sulphonic acid group.

16. As a new composition of matter, a solid, stable, crystalline diazo salt obtained by the interaction of an acid solution of diazotized 2:5-di-chloro-aniline and a diphenyl-disulphonic acid containing only substituents of the group consisting of nitro, chloro and sulphonic acid.

17. As a new composition of matter, a solid, stable, crystalline diazo salt obtained by the interaction of an acid solution of diazotized para-nitro-ortho-anisidine and a diphenyl-disulphonic acid containing only substituents of the group consisting of nitro, chloro and sulphonic acid.

18. A solid diazo salt obtained by the interaction of a diazo body obtained from an unsulphonated primary aromatic amine and a diphenyl sulphonic acid which may be substituted by one or more members of the group consisting of halogen and nitro radicals.

19. The composition of claim 18 in which the diphenyl sulphonic acid is a diphenyl-di-sulphonic acid.

20. A solid diazo salt obtained by the interaction of a diazo body obtained from an unsulphonated primary aromatic amine and a halogen-diphenyl sulphonic acid.

21. A solid diazo salt obtained by the interaction of a diazo body obtained from an unsulphonated primary aromatic amine and a nitro-diphenyl sulphonic acid.

22. A solid diazo salt obtained by the interaction of a diazo body obtained from an unsulphonated primary aromatic amine and a nitro-halogen-diphenyl sulphonic acid.

23. A solid diazo salt obtained by the interaction of a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and a diphenyl sulphonic acid which may be substituted by one or more members of the group consisting of halogen and nitro radicals.

24. The composition of claim 23 in which the aromatic amine is a member of the benzene series.

25. A solid diazo salt obtained by the interaction of a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and a diphenyl-di-sulphonic acid.

26. The composition of claim 23 in which the aromatic amine is a member of the benzene series and the diphenyl sulphonic acid is a diphenyl-di-sulphonic acid.

27. A solid diazo salt obtained by the interaction of a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and a halogen-diphenyl sulphonic acid.

28. A solid diazo salt obtained by the interaction of a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and nitro-diphenyl sulphonic acid.

29. A solid diazo salt obtained by the interaction of a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and a nitro-halogen, diphenyl sulphonic acid.

30. The process of preparing a diazo salt which comprises interacting in acid solution a diazo body obtained from an unsulphonated primary aromatic amine of the benzene, diphenyl, di-phenyl-ether, azo-benzene and naphthalene series substituted by one or more members of the group consisting of halogen, nitro, alkyl and alkoxy radicals and a diphenyl sulphonic acid which may be substituted by one or more members of the group consisting of halogen and nitro radicals.

31. The process of claim 30 in which the aromatic amine is a member of the benzene series.

32. The process of claim 30 in which the aromatic amine is a member of the benzene series and the diphenyl sulphonic acid is a diphenyl-di-sulphonic acid.

In testimony whereof, I affix my signature.

MILES A. DAHLEN.